United States Patent [19]

Fellows

[11] Patent Number: 5,498,092

[45] Date of Patent: Mar. 12, 1996

[54] PROTECTIVE COVER FOR A BALL JOINT ASSEMBLY

[75] Inventor: Russell T. Fellows, Harrison Township, Mich.

[73] Assignee: TRW Inc., Lyndhurst, Ohio

[21] Appl. No.: 264,477

[22] Filed: Jun. 23, 1994

[51] Int. Cl.[6] .................................................. B65D 59/00
[52] U.S. Cl. ................ 403/12; 403/23; 403/51; 403/122; 403/315; 411/372; 411/374; 411/377; 277/212 FB
[58] Field of Search ........................ 277/212 FB, 212 R; 403/11, 12, 23, 51, 2, 134, 122, 119, 315; 411/377, 374, 373, 372, 431, 429, 432

[56] References Cited

U.S. PATENT DOCUMENTS

| | | | |
|---|---|---|---|
| 1,368,723 | 2/1921 | Helvig | 411/372 X |
| 3,007,720 | 11/1961 | Breitenstein | 403/122 X |
| 3,104,681 | 9/1963 | Gray, Jr. | 138/96 R |
| 3,199,902 | 8/1965 | Fierstine | 403/12 |
| 3,596,915 | 8/1971 | Snidar | 403/122 X |
| 3,598,434 | 8/1971 | Patton et al. | 403/11 |
| 4,415,825 | 11/1983 | Dailey et al. | 403/23 X |
| 4,552,480 | 11/1985 | McIntyre | 403/134 X |
| 4,610,559 | 9/1986 | Mayhew et al. | 403/23 |
| 4,639,159 | 1/1987 | Amrath | 403/51 X |
| 4,750,878 | 6/1988 | Nix et al. | 411/377 X |
| 4,848,950 | 7/1989 | Haberstroh | 403/12 |
| 4,884,467 | 12/1989 | Martell | 403/51 X |

FOREIGN PATENT DOCUMENTS

| | | | |
|---|---|---|---|
| 1196434 | 7/1965 | Germany | 403/122 |
| 636531 | 3/1962 | Italy | 411/377 |
| 2100337 | 12/1982 | United Kingdom | 403/122 |

*Primary Examiner*—Dave W. Arola
*Assistant Examiner*—Christopher J. Novosad
*Attorney, Agent, or Firm*—Tarolli, Sundheim & Covell

[57] ABSTRACT

A protective cover 12 for a ball joint assembly 10 includes a generally cylindrical plug 96 with axially extending resilient fingers 100 engageable with a shaft 40 of a stud 26 of the ball joint assembly 10 to prevent removal of the cover 12 from the ball joint assembly 10. A frustoconical cam surface 90 on a generally cylindrical sidewall 72 defining a chamber 70 for enclosing the stud 26 moves the fingers 100 toward the stud 26 upon movement of the plug 96 relative to the cam surface 90.

13 Claims, 2 Drawing Sheets

PROTECTIVE COVER FOR A BALL JOINT ASSEMBLY

BACKGROUND OF THE INVENTION

The present invention relates to a protective cover for a threaded stud, and more particularly relates to a protective cover for the threaded stud of a ball joint assembly.

Ball joint assemblies are subjected to extensive handling after manufacture. For example, many joint assemblies are commonly manufactured at one location and shipped to another location for installation in a vehicle. In a typical example, a ball joint assembly is assembled into a suspension control arm. The suspension control arm with the ball joint assembly is then installed in a vehicle. U.S. Pat. No. 3,598,434 discloses a cover which may be used to protect the ball joint assembly, especially a threaded stud of the ball joint assembly, prior to and during assembly into the control arm and during subsequent handling. The cover is removed, preferably immediately prior to installation of the control arm in a vehicle. One problem with the cover is that the cover may fall off of the ball joint assembly during handling of the ball joint assembly. Also, the cover does not provide protection for a seal extending between the threaded stud and a housing of the ball joint assembly.

SUMMARY OF THE INVENTION

An improved protective cover for a ball joint assembly includes a structure for maintaining the cover on the ball joint assembly during handling of the ball joint assembly and for permitting easy removal of the protective cover at the appropriate time.

The improved protective cover includes a generally cylindrical sidewall defining a chamber which encloses a threaded stud of the ball joint assembly. A generally cylindrical plug extends through an axial end opening in the sidewall and into the chamber. The plug includes a plurality of axially extending resilient fingers engageable with the stud of the ball joint assembly. A frustoconical cam surface on the sidewall engages the resilient fingers and moves the resilient fingers toward the stud upon axial movement of the plug relative to the sidewall and into the chamber. The resilient fingers tightly grip the stud and prevent removal of the cover from the ball joint assembly.

The cover has two positions for protecting the threaded stud and a seal extending between the stud and a housing. In one position the cover does not interfere with the assembly of the ball joint into a control arm. In the other position a skirt on the cover provides good protection of the seal after the ball joint is assembled with the control arm. The plug permits movement of the cover from the one position to the other position and prevents accidental removal of the cover from either position.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
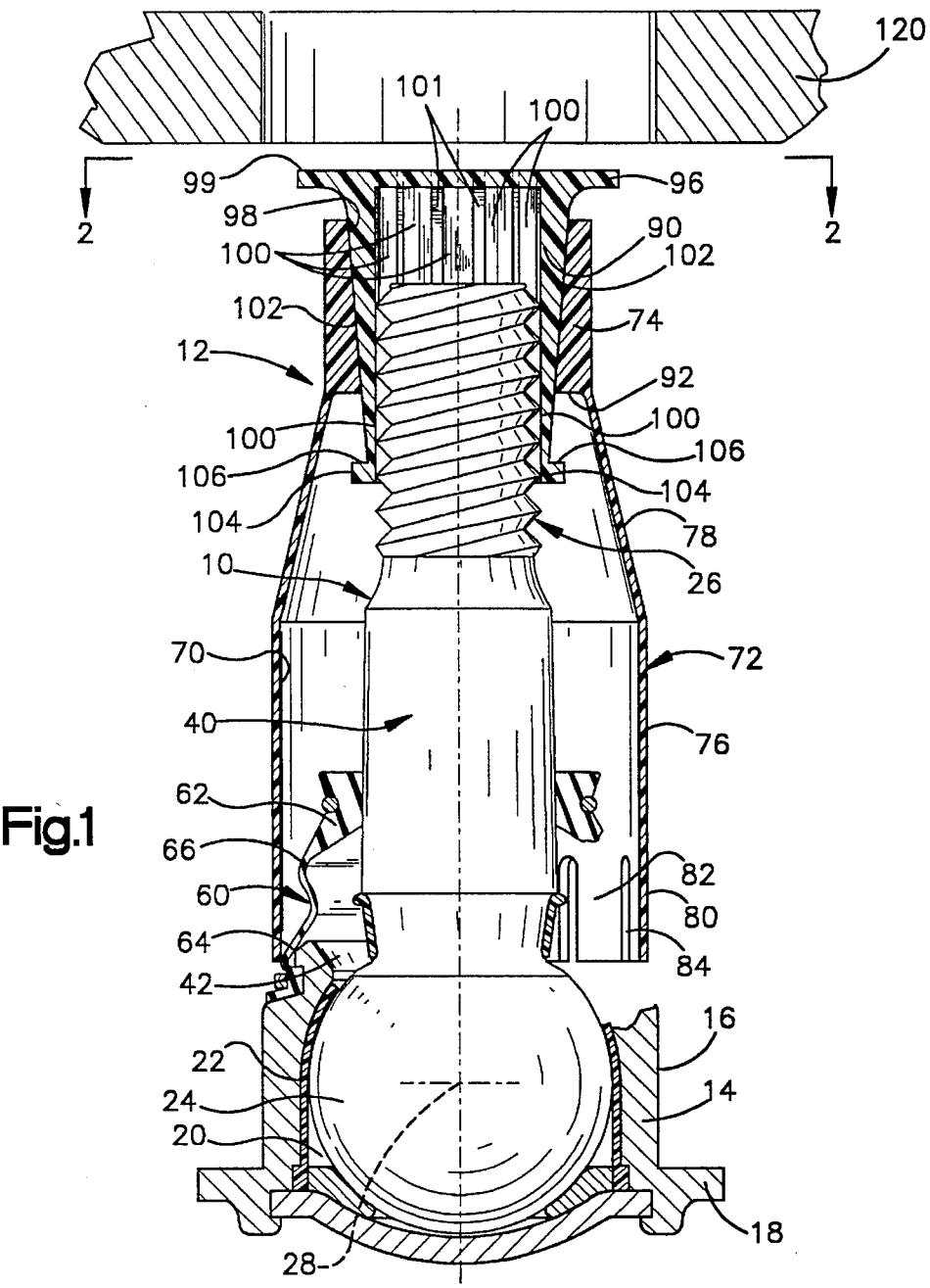
FIG. 1 is a view, partially in section, of a ball joint assembly enclosed by a protective cover of the present invention.

A ball joint assembly 10 (FIG. 1) is enclosed by a protective cover 12 constructed in accordance with the present invention. The ball joint assembly 10 includes a rigid metal socket 14 (housing) having a generally cylindrical sidewall 16 and a mounting flange 18. The socket 14 defines a socket chamber 20. A bearing 22 is located in socket chamber 20. The socket 14 is preferably cold formed or screw machined from SAE grade 1008 or 1010 steel which is available from LTV Steel. The bearing 22 comprises two pieces preferably made of an injection molded Delrin®500CL plastic which is available from E. I. DuPont De Nemours and Co.

The bearing 22 supports a spherical ball portion 24 of a ball stud 26. The bearing 22 supports the ball stud 26 for limited rotation and pivoting movement about a center of oscillation 28. The center of oscillation 28 is coincident with the center of the spherical ball portion 24. The ball stud 26 is preferably cold formed or screw machined and then carbonized. The ball stud 26 is made of SAE grade 8115M or 8615 steel which is available from LTV Steel.

A shank portion 40 of the ball stud 26 projects through a circular opening 42 in the socket 14. A flexible boot seal member 60 circumscribes and seals the opening 42 between the ball stud 26 and the socket 14. The seal member 60 includes a shank seal portion 62 which encircles and seals against the shank portion 40 of the ball stud 26 and a socket seal portion 64 which seals against the socket 14. The shank seal portion 62 and the socket seal portion 64 are interconnected by a connector portion 66. The seal member 60 has a passage through which the ball stud shank portion 40 extends. The seal on the right side of FIG. 1 is broken away for illustration purposes. The seal member 60 is formed of a suitable synthetic rubber or polymeric material, such as Compound #1806-85 A urethane, which is available from Trostel.

The protective cover 12 is made of a suitable plastic or other material, preferably polyethylene. The protective cover 12 has a generally cylindrical chamber 70 which receives the shank portion 40 of the ball stud 26 and the seal member 60. The protective cover 12 encloses the shank portion 40 of the ball stud 26 and the seal member 60 to protect them during handling.

The protective cover 12 includes a sidewall 72. The sidewall 72 has a cylindrical upper end portion 74, as viewed in FIG. 1, and a somewhat larger diameter cylindrical lower end portion 76. The upper and lower end portions 74 and 76 are interconnected by a frustoconical intermediate connector section 78.

A generally cylindrical skirt section 80 extends axially downward, as viewed in FIG. 1, from the lower end portion 76 of the sidewall 72. The skirt section 80 includes a plurality of segments 82 which are separated by axially extending slots 84. Thus skirt segments 82 are easily deflected radially outward by engagement with the socket 14.

The upper portion 74 of the sidewall 72 has an inner frustoconical cam surface 90. The cam surface 90 has a large inner diameter at an axial end portion of the sidewall 72 and a smaller inner diameter located toward the connector section 78. The upper portion 74 also includes an annular stop surface 92 extending radially outward from the small diameter portion of the cam surface 90.

Figure 2:
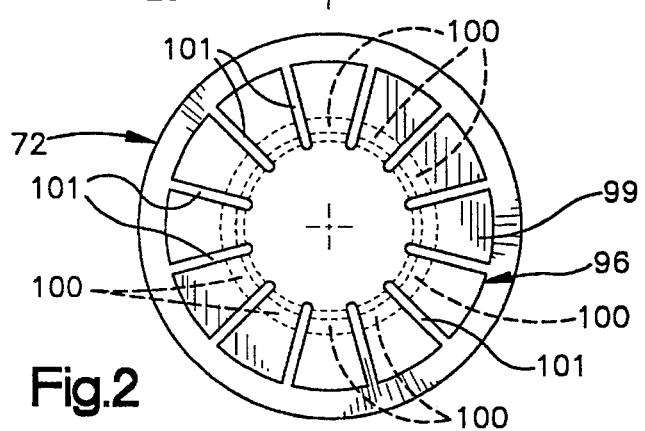
FIG. 2 is a view of an end of the protective cover of FIG. 1 taken along the lines 2—2 of FIG. 1.
Figure 3:
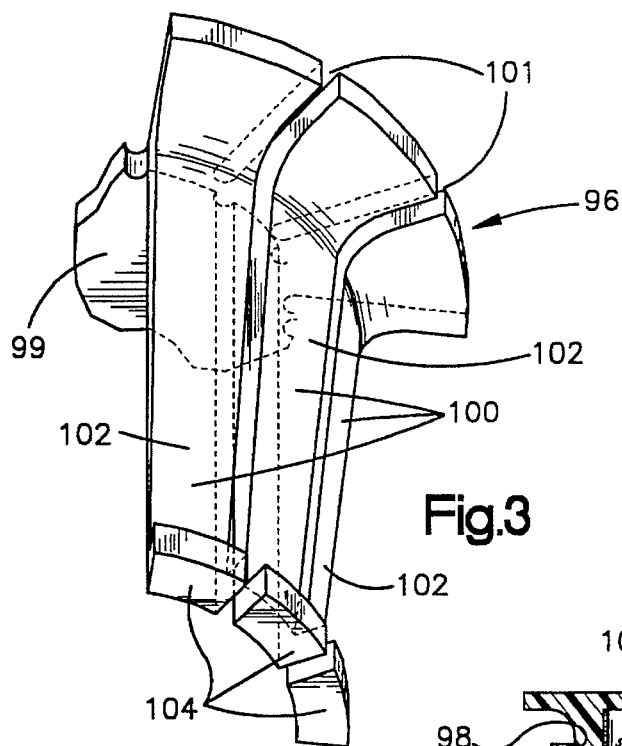
FIG. 3 is a pictorial view of a portion of a plug of the protective cover of FIG. 1.

A generally cylindrical plug 96 extends through an axial end opening 98 in the sidewall 72 and into the chamber 70. The plug 96 includes a base 99 and a plurality of axially extending resilient fingers 100, some of which are shown in FIG. 3, extending from the base. The fingers 100 are separated by radially extending slots 101 in the base 99 (FIG. 2). The fingers 100 (FIGS. 1 and 3) have radially outer side surfaces 102 which engage the cam surface 90 of the sidewall 72. The resilient fingers 100 also include radially outward extending portions 104 which have upper surfaces 106, as viewed in FIG. 1, which engage the stop surface 92 of the sidewall 72 to prevent removal of the plug 96 from the cover 12.

The plug 96 is inserted into the chamber 70 through the opening 98 prior to placing the cover 12 on the ball joint 10. While moving the plug 96 axially relative to the sidewall 72, the radially extending portions 104 of the fingers 100 engage the cam surface 90 of the upper portion 74. The cam surface 90 pushes the resilient fingers radially inward. When the radially extending portions 104 of the fingers 100 move axially past the cam surface 90, the fingers 100 expand radially outward so that the surfaces 102 of the fingers engage the cam surface. Also, the surfaces 106 of the portions 104 may be engageable with the stop surface 92 to prevent the plug 96 from moving axially out of the cover 12.

After the ball joint assembly 10 has been fabricated, it is aligned with the cylindrical chamber 70 of the protective cover 12. Then the protective cover 12 is telescoped over the shank portion 40 of the ball stud 26 and seal member 60 until the skirt portion 80 of the sidewall 72 engages the boot seal 60. As the cover 12 is telescoped over the shank portion 40, the shank portion 40 frictionally engages the radially inner surfaces of the fingers 100, and this prevents axial movement of the plug 96 relative to the shank portion 40 even though the sidewall 72 continues to move downward, as viewed in FIG. 1.

Once the skirt portion 80 engages the boot seal 60, the plug 96 is manually pushed axially downward, as viewed in FIG. 1, relative to the sidewall 72 and the shank portion 40 to the position shown in FIG. 1. Upon axial movement of the plug 96, the cam surface 90 presses the fingers 100 toward the shank portion 40. The fingers 100 tightly engage the shank portion 40 and cam surface 90 and prevent removal of the cover 12 from the ball joint 10. Thus, the ball joint assembly 10 is encircled by the protective cover 12 and is protected from damage during handling and shipping.

Figure 4:
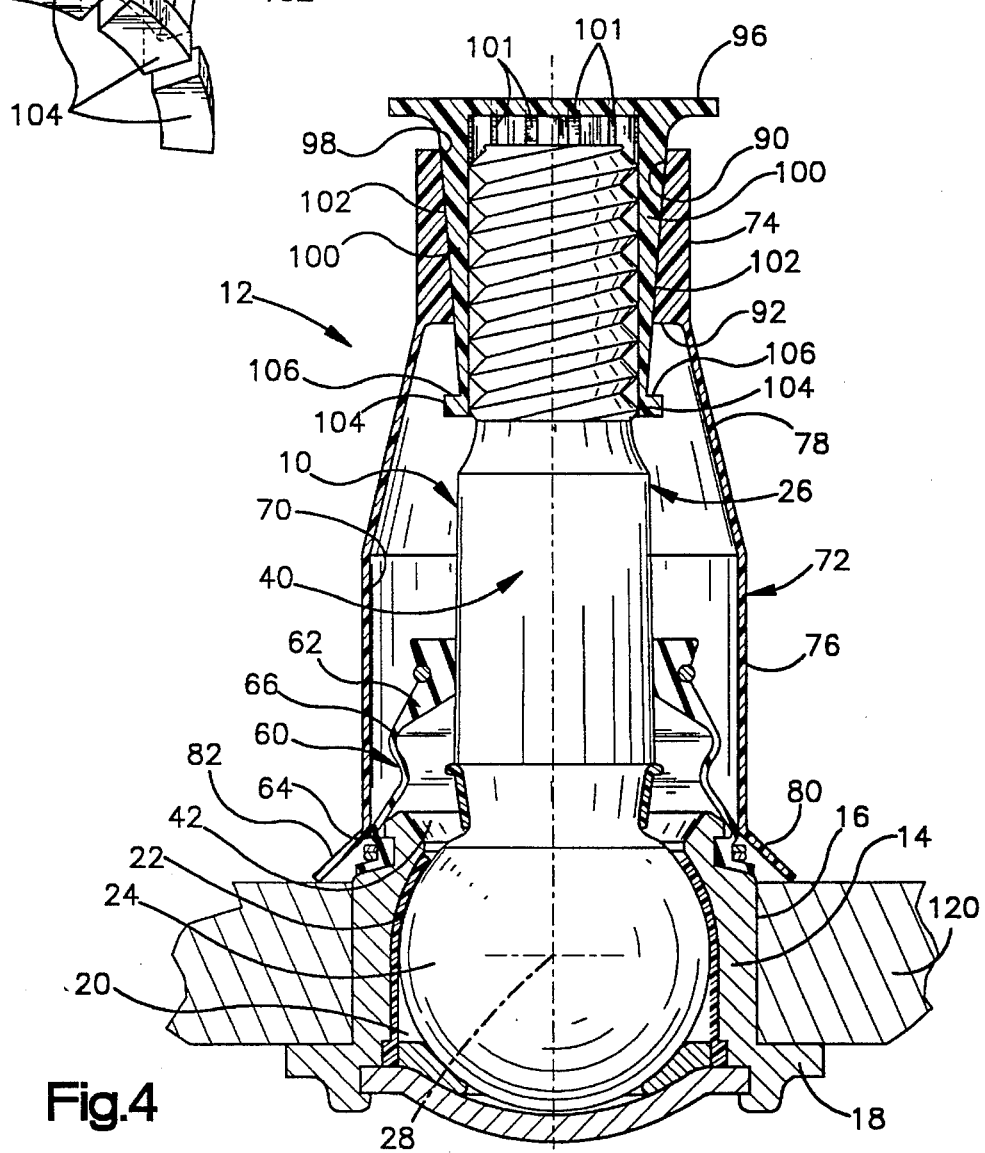
FIG. 4 is a sectional view, similar to FIG. 1, illustrating the ball joint assembly installed in a control arm of a vehicle.

The ball joint assembly 10 encircled by the protective cover 12 is then assembled onto a control arm 120. The protective cover 12 and the ball joint assembly 10 are telescoped through a hole in the control arm 120 until the mounting flange 18 of the ball joint assembly 10 abuts the control arm 120 (FIG. 4).

After the ball joint assembly 10 is assembled onto the control arm 120, the sidewall 72 is moved axially toward the control arm 120 by pressing downward on the connector section 78, as viewed in FIG. 3. As this movement occurs, the skirt segments 82 of the protective cover 12 resiliently deflect outward due to engagement with the socket 14 and the control arm 120. Also, as this movement occurs, the plug 96 does not move axially and the sidewall 72 moves relative to the plug 96. The plug 96 is then manually moved axially relative to the sidewall 72 and the ball joint assembly 10 to the position shown in FIG. 4. The cam surface 90 again causes the fingers 100 to move radially inward and tightly grip the shank portion 40 of the ball joint assembly. The boot seal 60 is thus well protected by the skirt portion 80 until the control arm 120 is assembled with a vehicle.

When the control arm 120 is to be assembled with a vehicle, the plug 96 is manually pulled axially upward, as seen in FIG. 3, relative to the sidewall 72 and the ball joint assembly 10. As the plug 96 moves axially relative to the ball joint assembly 10 and the sidewall 72, the fingers 100 move radially outward and the surfaces 106 of the radially extending portions 104 engage the annular surface 92 to pull the sidewall 72 axially to remove the cover 12 from the ball joint assembly.

From the above description of the invention, those skilled in the art will perceive improvements, changes and modifications. Such improvements, changes and modifications within the skill of the art are intended to be covered by the appended claims.

Having described the invention, the following is claimed:

1. A protective cover for a ball joint assembly having a socket with a ball stud and a seal between the socket and the ball stud, said cover comprising:

a generally cylindrical side wall defining a generally cylindrical chamber for enclosing the stud;

retaining means for engaging a shaft of the ball stud to prevent removal of said cover from the ball joint; and cam surface means for engaging said retaining means and moving said retaining means toward the stud upon movement of said retaining means relative to said cam surface means.

2. A protective cover as set forth in claim 1 wherein said cover further includes means defining an axial end opening communicating with said chamber and said retaining means comprises a generally cylindrical plug extending through said axial end opening and into said chamber.

3. A protective cover as set forth in claim 2 wherein said plug includes a plurality of fingers engaging the stud to prevent removal of said cover from the ball joint, said cam surface means engaging said plurality of fingers to move said fingers toward the stud upon axial movement of said plug relative to said cam surface means.

4. A protective cover as set forth in claim 3 wherein said plurality of fingers comprise a plurality of axially extending resilient fingers.

5. A protective cover as set forth in claim 4 wherein said resilient fingers include radially extending means for engaging said side wall to prevent removal of said plug from said cover.

6. A protective cover as set forth in claim 1 wherein said cam surface means comprises a tapered surface of said side wall.

7. A protective cover as set forth in claim 6 wherein said tapered surface comprises a frustoconical surface having a first inner diameter located at an axial end portion of said side wall and a second inner diameter smaller than the first diameter spaced apart from said axial end portion of said side wall toward an axially central portion of said side wall.

8. A protective cover as set forth in claim 1 wherein said side wall includes stop surface means for engaging said retaining means to prevent removal of said retaining means from said cover.

9. A protective cover as set forth in claim 8 wherein said retaining means includes a radially outward extending means for engaging said stop surface means to prevent removal of said retaining means from said cover and to remove said cover from the stud.

10. An apparatus comprising:

a socket;

a ball stud having a shank portion extending from said socket;

a seal between said shank portion and said socket; and a protective cover comprising walls defining a chamber for receiving said shank portion and said seal, said cover including a plug extending into said chamber and engaging said shank portion of said stud, said walls including cam surface means for engaging said plug and moving a portion of said plug toward said stud in response to relative movement between said cam surface means and said plug.

11. An apparatus as set forth in claim 10 wherein said cam surface means comprises a frustoconical surface having a first inner diameter located at an axial end portion of said chamber and a second inner diameter smaller than the first inner diameter spaced apart from said axial end portion of said chamber toward an axially central portion of said chamber.

12. An apparatus as set forth in claim 11 wherein said plug includes a plurality of axially extending fingers, said fingers engaging said frustoconical surface to move said fingers toward said stud in response to axial movement of said plug relative to said walls.

13. An apparatus as set forth in claim 10 wherein said plug includes surface means for engaging said walls upon axial movement of said plug relative to said stud to remove said cover from said stud.

* * * * *